UNITED STATES PATENT OFFICE.

SAMUEL PEACOCK, OF CHICAGO, ILLINOIS, ASSIGNOR, BY MESNE ASSIGNMENTS, TO AGRICULTURAL RESEARCH CORPORATION, OF NEW YORK, N. Y., A CORPORATION OF NEW YORK.

PROCESS FOR THE MANUFACTURE OF DOUBLE NITRID.

1,147,184.     Specification of Letters Patent.     Patented July 20, 1915.

No Drawing.     Application filed December 10, 1912. Serial No. 736,042.

*To all whom it may concern:*

Be it known that I, SAMUEL PEACOCK, a citizen of the United States, residing at Chicago, in the county of Cook and State of Illinois, have invented certain new and useful Improvements in Processes for the Manufacture of Double Nitrids; and I do hereby declare the following to be a full, clear, and exact description of the invention, such as will enable others skilled in the art to which it appertains to make and use the same.

This invention relates to a process of producing compound nitrids of the metals and hydrogen suitable for the manufacture of ammonia and for other purposes, and has for its object to produce said nitrids from the air in a direct simple and economical manner.

To these ends the invention consists in the steps and combinations of steps more fully hereinafter disclosed and particularly pointed out in the claim.

I have discovered that the various carbids when heated to high temperatures (from say 1100° C. to 1800° C. depending on the particular metal radical) in the presence of nitrogen, but out of contact with oxygen or other readily oxidizing gases, dissociate with the formation of double nitrids of carbon and the combined metal, substantially in accordance with the following equation, in which R represents a metal or alkali earth metal radical $$3RC + 3N_2 = R_3N_2.C_3N_4.$$

It should be especially observed in this reaction that the valency of all the combined elements remains the same as in the individual elements at normal temperatures and pressure; and, further, that upon treating the reaction product $R_3N_2.C_3N_2$ with water, ammonia will be given off, while there will be formed those oxids of the metal and of carbon which are well known to be stable under normal conditions.

I have further discovered that the metal hydrids, when heated in a manner precisely as the carbids, give as an end product compounds similar in all technical essentials to the carbid end products, but the reactions may be effected at temperatures materially lower than is the case with the carbids.

These hydrid reactions will be understood from the following equation in which R again represents a metal radical or alkaline earth metal radical $$3R_3H_2 + 2N_2 = R_3N_2.H_6N_2.$$

This reaction only represents the end result, which is, of course, preceded by other intermediate reactions, the exact nature of which I am not able, with my present knowledge, to give. The end product the same as before, however, will give off ammonia upon treating with water.

At temperatures much in excess of that necessary for this end reaction (which in the case of R=Ca, will be about 900° C. or 1000° C.) the double nitrid will more or less dissociate into $R_3N_2$ and $2NH_3$, which latter is further largely decomposed at such temperatures into free nitrogen and hydrogen, accompanied by more or less complex hydrids which I have not as yet isolated.

I have found that it not necessary to confine my process to the treatment of previously formed hydrids, and that the double nitrid can be formed in one operation by the treatment of metal oxids at the necessary temperatures with the mixture of nitrogen and hydrogen, as will be clear from the following equation:—

$$3RO + 6H_2 + 2N_2 = R_3N_2.H_6N_2 + 3H_2O.$$

To accomplish this reaction, the mixed nitrogen and hydrogen gases should be passed through the heated oxid in such manner that the gaseous products of the reaction do not come into contact with the double nitrid produced. I accomplish this by any suitable furnace familiar to those skilled in this art, and not here illustrated.

In the case of alkaline earth metals, such as calcium, for example, the temperature required to reduce the oxid is so high that the end product $Ca_3N_2.N_2H_6$ is very largely decomposed to the metal nitrid $Ca_3N_2$; and, although one-half of the nitrogen thus combined leaves the furnace with the gaseous products, yet, nevertheless, the process supplies a very economical method for making this particular metal nitrid. Further, in this instance, a very considerable proportion of the ammonia dissociated upon the breaking up of the double nitrid, may be recovered by suitable means from the gaseous products of the reaction.

In addition to the above, I have likewise discovered that if the metal oxid is briqueted with carbon and coked in any suitable manner, the carbon present being sufficient in quantity to enable the use of the hot briquets as a resistor element, that the reaction proceeds evenly and with a high velocity, while the exit gases contain a considerable proportion of cyanogen $C_2N_2$. Also, I have discovered that by maintaining a high column of hot briquets (say from twenty to forty inches high) a mixture of air and steam is as effectual, when brought into contact with the briquets as is a mixture of nitrogen and hydrogen, though the carbon consumption and the heat energy that disappear, both exceed that necessary when the pure gases are used. The proportion of carbon in the briquets must be such that more than sufficient is present to convert all the oxygen in the air and steam to carbon monoxid, and the efficiency of the utilization of the nitrogen and hydrogen is found to be quite low.

It is obvious that those skilled in the art may vary the details of my process without departing from the spirit of my invention, and therefore I do not wish to be limited to the above disclosure except as may be required by the claim.

What I claim is:—

The process of producing calcium nitrid $Ca_3N_2$, which consists in heating calcium oxid mixed with carbon in the form of briquets in the presence of free hydrogen and nitrogen to a temperature sufficient to break up the double nitrid of calcium and hydrogen thus formed into calcium nitrid $Ca_3N_2$ and ammonia.

In testimony whereof, I affix my signature, in presence of two witnesses.

SAMUEL PEACOCK.

Witnesses:
MARGARET E. CHESTER,
MAY E. KIMMITT.

Copies of this patent may be obtained for five cents each, by addressing the "Commissioner of Patents, Washington, D. C."